UNITED STATES PATENT OFFICE.

EDWARD DURYEE, OF LOS ANGELES, CALIFORNIA.

GYPSUM PLASTER AND RETARDER THEREFOR.

1,151,095.

Specification of Letters Patent. Patented Aug. 24, 1915.

No Drawing. Application filed December 29, 1913. Serial No. 809,278.

*To all whom it may concern:*

Be it known that I, EDWARD DURYEE, a citizen of the United States, residing at Los Angeles, in the county of Los Angeles and State of California, have invented a new and useful Gypsum Plaster and Retarder Therefor, of which the following is a specification.

One object of the present invention is to prepare bean straw, broom straw and other fibrous materials for use in conjunction with plaster in making mortars, and for similar uses.

I have found that some of the straws such as bean straw and broom straw when used in natural state for fiber in mortars, together with gypsum plaster as a base, unduly delay the setting time of the mortar, by reason of such straws containing a material that retards the setting operation.

An important object of the present invention is to remove such retarding material from the straw, thereby adapting it for more satisfactory use as a component in mortars.

A further object of the invention is to produce from such straws a retarding material for use in connection with hard wall plastering and other uses, and to utilize for this purpose the extract removed from the fiber in order to decrease its retarding action.

In the manufacture of building blocks it is desirable to have the mortar set as quickly as possible, so as to reduce as much as possible, the time which the articles must be retained in the molds. For a certain class of operations, for example, in making ornamental or stucco work, it is also desirable to have the plaster set as rapidly as possible so as to prevent deformation during the setting operation. In all of these cases it is necessary that any fiber used in the mortar should be free from retarding agent. On the other hand, plaster which is used for ordinary wall plastering must have sufficient retarder present to maintain it in workable condition during the time required for the ordinary plastering operation. Moreover, this retarder must be in the mortar independently of the fiber, since the finish coat must be free from fiber, but must contain the retarder, whereas the rough coat must contain both the fiber and retarder.

A further object of the invention is to provide a retarder for use with wall plaster which will not reduce the strength of the plaster.

Other objects of the invention will appear hereinafter.

I will describe my invention as applied to the production of fiber from bean straw. I take the ordinary bean straw and first boil it in water in a suitable vat until it is softened. It is next passed through a set of rolls to press out the liquor, then passed into a rinsing vat of fresh water in order to more completely remove the retarding contents. It then goes through another set of rolls to remove the excess of water, and finally is delivered in a damp condition to a shredding machine. This shredding machine may be of any design suitable for separating the fiber, such as is commonly used for such purposes. The first liquor used in boiling the straw remains in the vat and gradually becomes concentrated. When the liquor becomes too saturated to readily dissolve the retarder from the straw, it is treated to recover or obtain the retarder as a by-product. I prefer to add to the liquor a suitable bleaching and preserving agent such as chlorid of lime, both to lighten the color and to preserve the product. In case it is desired to bleach the fiber, this bleaching agent is added before or during the leaching or extracting operation. The liquor containing the retarding extract of the fiber is evaporated to dryness and the residue, a dry cake, is ground to powder in which condition it is suitable for use as a retarder such as is commonly used in the preparation of commercial hard wall plasters. When so used, this retarder consisting of the water soluble extracts of bean straw or bean fiber produces a plaster which is considerably stronger than that which is produced with the use of ordinary commercial retarders. Straw prepared in this way will furnish a fiber suitable for many uses such as in the preparation of plaster mortars as well as for the manufacture of textile fabrics of various kinds, gypsum building blocks, plaster board, etc. I am aware that these or similar straws have been used for fiber in making building blocks and mortars, but their tendency to slow setting effect has rendered it necessary to use some quickening material to counteract this tendency, but this proposed treatment, not only makes that unnecessary but also produces as a by-product a valuable retarder. Instead of bean straw, I may use broom straw, and my invention includes in this connection the water soluble extract of any straw which acts in the same manner as the described extract of bean straw.

What I claim is:

1. The process of making a gypsum plaster which consists in mixing with the mortar and water or such plaster, a retarder consisting of the water soluble extract of bean straw and allowing the plaster to set.

2. A plaster product which consists in a gypsum mortar together with the water soluble extract of bean straw.

In testimony whereof, I have hereunto set my hand at Los Angeles, California this 26th day of November 1913.

EDWARD DURYEE.

In presence of—
 A. P. KNIGHT,
 LORRAINE E. DURROW.

Copies of this patent may be obtained for five cents each, by addressing the "Commissioner of Patents, Washington, D. C."